(12) United States Patent
Kawka et al.

(10) Patent No.: US 10,457,013 B2
(45) Date of Patent: *Oct. 29, 2019

(54) COMPOSITE SHEET AND CARGO CONTAINER COMPRISING SAME

(71) Applicant: E I DU PONT DE NEMOURS AND COMPANY, Wilmington, DE (US)

(72) Inventors: Dariusz Wlodzimierz Kawka, Midlothian, VA (US); Tomas L. Perez, Richmond, VA (US)

(73) Assignee: DuPont Safety & Construction, Inc., Wilmington, DE (US)

(*) Notice: Subject to any disclaimer, the term of this patent is extended or adjusted under 35 U.S.C. 154(b) by 733 days.

This patent is subject to a terminal disclaimer.

(21) Appl. No.: 14/287,691

(22) Filed: May 27, 2014

(65) Prior Publication Data

US 2015/0343736 A1 Dec. 3, 2015

(51) Int. Cl.
*B32B 5/02* (2006.01)
*B32B 7/12* (2006.01)
(Continued)

(52) U.S. Cl.
CPC ............... *B32B 5/02* (2013.01); *B32B 7/12* (2013.01); *B32B 27/10* (2013.01); *B65D 37/00* (2013.01);
(Continued)

(58) Field of Classification Search
CPC ........ B32B 2250/40; B32B 2262/0269; B32B 2262/101; B32B 2262/106; B32B 2307/718; B32B 2435/02; B32B 2439/00; B32B 27/10; B32B 27/12; B32B 19/046; B32B 19/06; B32B 2260/028;
(Continued)

(56) References Cited

U.S. PATENT DOCUMENTS 3,094,511 A 6/1963 DuPont
3,354,127 A 11/1967 DuPont
(Continued)

FOREIGN PATENT DOCUMENTS

WO 01/98434 A1 12/2001
WO 2012/088366 A1 6/2012
WO 2013/126739 A1 8/2013

OTHER PUBLICATIONS

Alain Jacques & Nicolas Orance, Development of a Thermal/Acoustic Insulation Blanket, Fire and Cabin Safety Research, Nov. 18, 2004, p. 1-9.

(Continued)

*Primary Examiner* — Vincent Tatesure (57) ABSTRACT

This invention is directed to a non-rigid composite sheet comprising in order (i) a first component having an areal weight of from 88 to 678 gsm comprising a first fabric of filamentary yarns having a tenacity of at least 11 g/dtex and a UV and weather impervious first polymeric layer. (ii) a second component having an areal weight of from 120 to 430 gsm comprising a flame resistant paper and (iii) a third component having an areal weight of from 88 to 678 gsm comprising a second fabric of filamentary yarns having a tenacity of at least 11 g/dtex and an impact and scratch resistant second polymeric layer, the second fabric of the third component being adjacent to the paper of the second component.

12 Claims, 5 Drawing Sheets

(51) Int. Cl.
*B32B 27/10* (2006.01)
*B65D 37/00* (2006.01)
*B65D 81/00* (2006.01)
*H01M 2/16* (2006.01)

(52) U.S. Cl.
CPC ............ *B65D 81/00* (2013.01); *H01M 2/162* (2013.01); *H01M 2/1613* (2013.01); *H01M 2/1653* (2013.01); *H01M 2/1666* (2013.01); *H01M 2/1686* (2013.01); *B32B 2250/05* (2013.01); *B32B 2250/40* (2013.01); *B32B 2262/0269* (2013.01); *B32B 2307/3065* (2013.01); *B32B 2439/62* (2013.01); *Y10T 428/1303* (2015.01); *Y10T 428/24942* (2015.01)

(58) Field of Classification Search
CPC ... B32B 2260/046; B32B 5/022; B32B 5/024; B32B 5/026; B32B 5/22; B32B 5/26; B32B 27/281; B32B 27/286; B32B 27/288; B32B 27/304; B32B 27/308; B32B 27/32; B32B 27/322; B32B 27/36; B32B 27/365; B32B 27/40; B65D 37/00; B65D 81/00; Y10T 428/1303; Y10T 428/24942
USPC .................................. 428/34.2, 212; 442/136
See application file for complete search history.

(56) References Cited

U.S. PATENT DOCUMENTS

| | | | |
|---|---|---|---|
| 3,673,143 A | 6/1972 | DuPont | |
| 3,767,756 A | 10/1973 | Blades | |
| 3,819,587 A | 6/1974 | Kwoleck | |
| 3,869,429 A | 3/1975 | Blades | |
| 3,869,430 A | 3/1975 | Blades | |
| 4,172,938 A | 10/1979 | Mera et al. | |
| 4,698,267 A | 10/1987 | Tokarsky | |
| 4,729,921 A | 3/1988 | Tokarsky | |
| 5,026,456 A | 6/1991 | Hesler et al. | |
| 5,084,136 A | 1/1992 | Haines et al. | |
| 5,223,094 A | 6/1993 | Kirayoglu et al. | |
| 5,314,742 A | 5/1994 | Kirayoglu et al. | |
| 5,474,842 A | 12/1995 | Hoiness | |
| 5,595,817 A | 1/1997 | Schafer et al. | |
| 6,312,561 B1 * | 11/2001 | Forsten ................... C04B 30/02 162/145 |
| 6,670,291 B1 * | 12/2003 | Tompkins ............... B32B 27/12 428/332 |
| 8,292,027 B2 | 10/2012 | Richardson, III et al. | |
| 2003/0170418 A1 | 9/2003 | Mormont et al. | |
| 2011/0079456 A1 | 4/2011 | Borumand | |
| 2013/0337246 A1 | 12/2013 | Turpin et al. | |

OTHER PUBLICATIONS

International Search Report and Written Opinion for International Patent Application No. PCT/US2015/031950 dated Feb. 24, 2016.
Definition of Scrim, Dictionary of Fiber & Textile Technology, Hoechst Celanese, p. 136.
Definition of Scrim, Engineered Materials Handbook, vol. 1; Composites, p. 21.
Data Sheet—Product Information, Styles 5768, and 5714; BGF Industries.

* cited by examiner

COMPOSITE SHEET AND CARGO CONTAINER COMPRISING SAME

BACKGROUND

1. Field of the Invention

This invention pertains to a non-rigid composite sheet having fire resistant properties. The sheet is useful as walls in a cargo container, particularly containers used in aircraft.

2. Description of Related Art

Cargo containers or unitary load devices (ULDs) are used in aircraft, ships, road vehicles and railcars to carry goods. For economic reasons there is a desire to reduce the weight of an empty container while minimizing its operational cost. Shipment of flammable materials in air cargo containers is creating a serious safety issue for airlines and air cargo carriers. There is increasing concern about the capability of existing containers to contain the spread of fire when the ignition source is the cargo itself. An example of such an ignition source is a lithium-ion battery. Consequently, to prevent possible human casualties and cargo equipment losses, airlines and air cargo carriers are looking for flame resistant cargo containers to contain fires that may originate within the containers. A tightening of regulatory requirements is expected over the next few years. There is therefore a need to provide a light weight cargo container having enhanced capability to contain the spread of fire from within the container that meet stringent durability standards while providing an extended lifetime with minimum maintenance.

U.S. Pat. No. 8,292,027 to Richardson et al describes a composite laminate comprising in order (a) a flame retardant polymeric moisture barrier (b) an inorganic platelet layer and (c) a flame retardant thermoplastic film layer.

United States patent application publication 2003/0170418 to Mormont and Jacques discloses a protection product having thermal and acoustic barrier characteristics such that it satisfies the requirements of the standard 14 CFR, part 25 issued by the Federal Aviation Administration. The product is designed to be applied along metallic and composite structures, such as aircraft cockpits, boat hulls or the outside structures of trains or of other means of transport. The product is essentially in the form of a "mat" consisting of one or several fiber layers, preferably glass fibers, enclosed in a sheath. The sheath generally comprises at least one first support, preferably made of an organic material having sealing and anti-condensation properties, and an impregnated mica paper. The mica paper preferably has a weight per unit area of less than 50 gsm and comprises flakes of mica with a form factor greater than 1000.

In a presentation entitled "Development of a Thermal/Acoustic Insulating Blanket Responding to the FAR 25.856 by the Integration of Mica Flame Barrier" at the Fire and Cabin Safety Research Conference in Lisbon on Nov. 18, 2004, Jacques and Orance describe the development of a mica paper for use in the construction of an aircraft fuselage.

SUMMARY OF THE INVENTION

This invention is directed to a non-rigid composite sheet comprising in order (i) a first component having an areal weight of from 88 to 678 gsm comprising a first fabric of filamentary yarns having a tenacity of at least 11 g/dtex and a first polymeric layer, (ii) a second component having an areal weight of from 120 to 430 gsm comprising a paper positioned adjacent to the first fabric of the first component and the second fabric of the third component, the paper further comprising aramid fibers, a polymeric binder and mica, and (iii) a third component having an areal weight of from 88 to 678 gsm comprising a second fabric of filamentary yarns having a tenacity of at least 11 g/dtex and a second polymeric layer, the second fabric of the third component being adjacent to the paper of the second component, wherein (a) the yarns of the first and second fabrics comprise aromatic polyamide, aromatic copolyamide, glass fiber or carbon fiber, and (b) the polymer of the first polymeric layer of the first component and second polymeric layer of the third component is polyurethane, polyethylene, polypropylene, polyethylenenaphthalate, polyacrylonitrile, fluoropolymer, polyimide, polyketone, polyimide, polysulfone, polyarlene sulfide, liquid crystal polymer, polycarbonate or an ionomer.

DETAILED DESCRIPTION

Figure 1A:
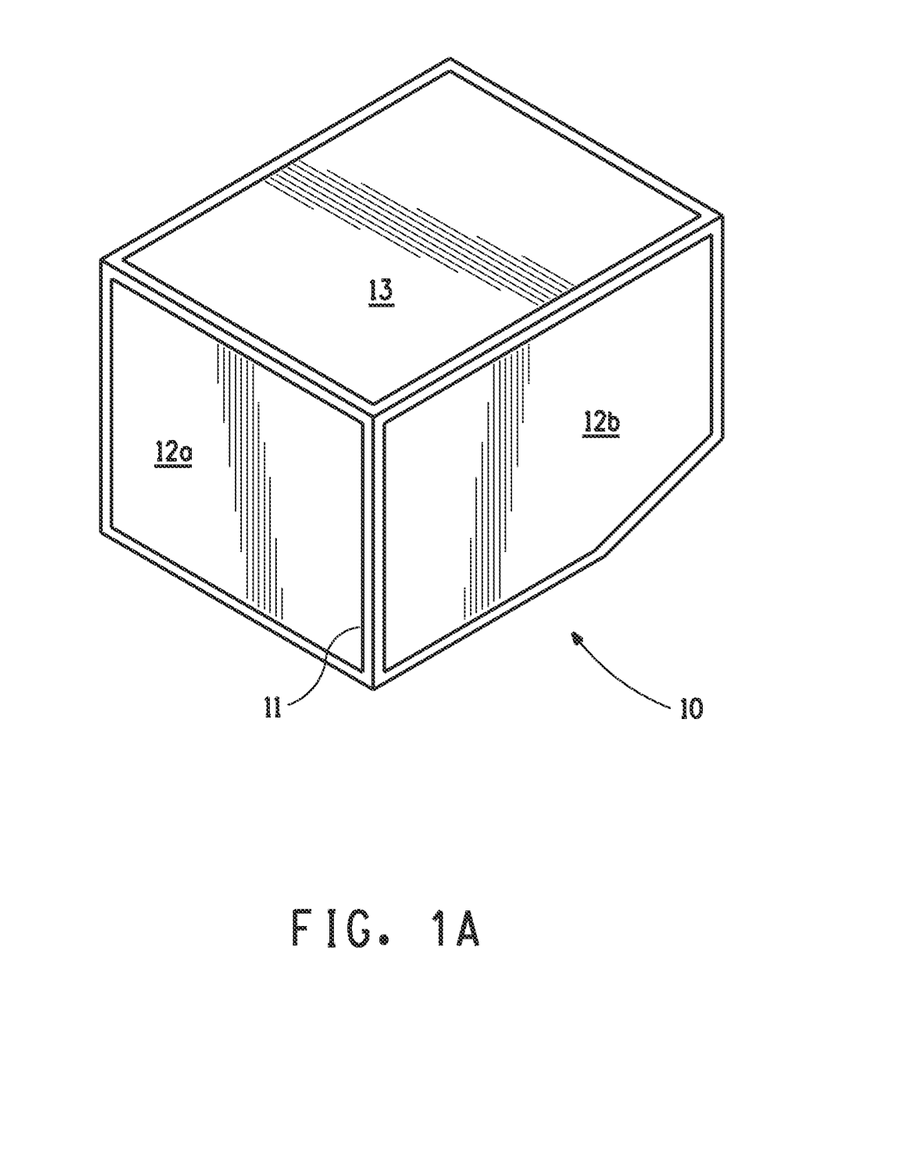
FIGS. 1A and 1B show a perspective of a cargo container.
Figure 1B:
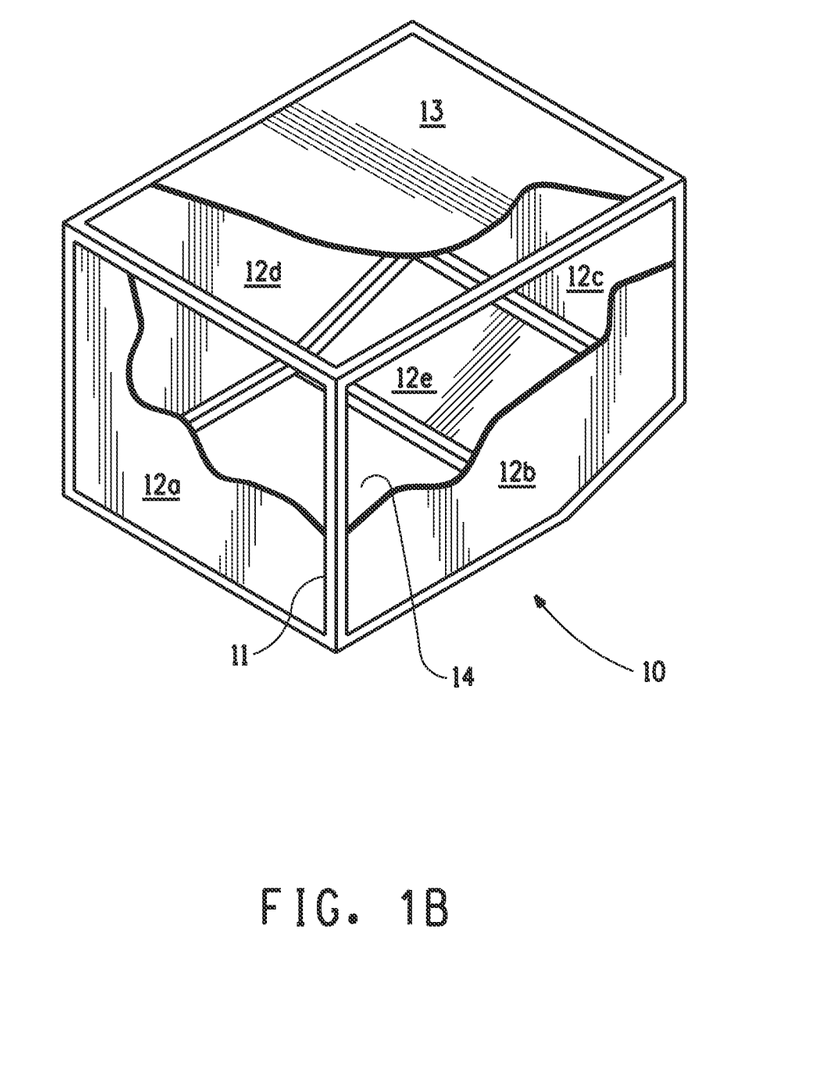

FIG. 1A shows at 10, a perspective of a fire resistant cargo container suitable for aircraft, seagoing vessels and the like for containing the effects of a fire within the cargo container. Shown in FIG. 1 is a frame assembly 11, side walls 12a, and 12b and a top 13. FIG. 2B shows a container comprising a frame assembly 11, a plurality of side walls 12a to 12e, a top 13 and a base 14. The side walls and ceiling comprise a non-rigid flame resistant composite sheet.

Non-Rigid Flame Resistant Composite Sheet.

Figure 2A:
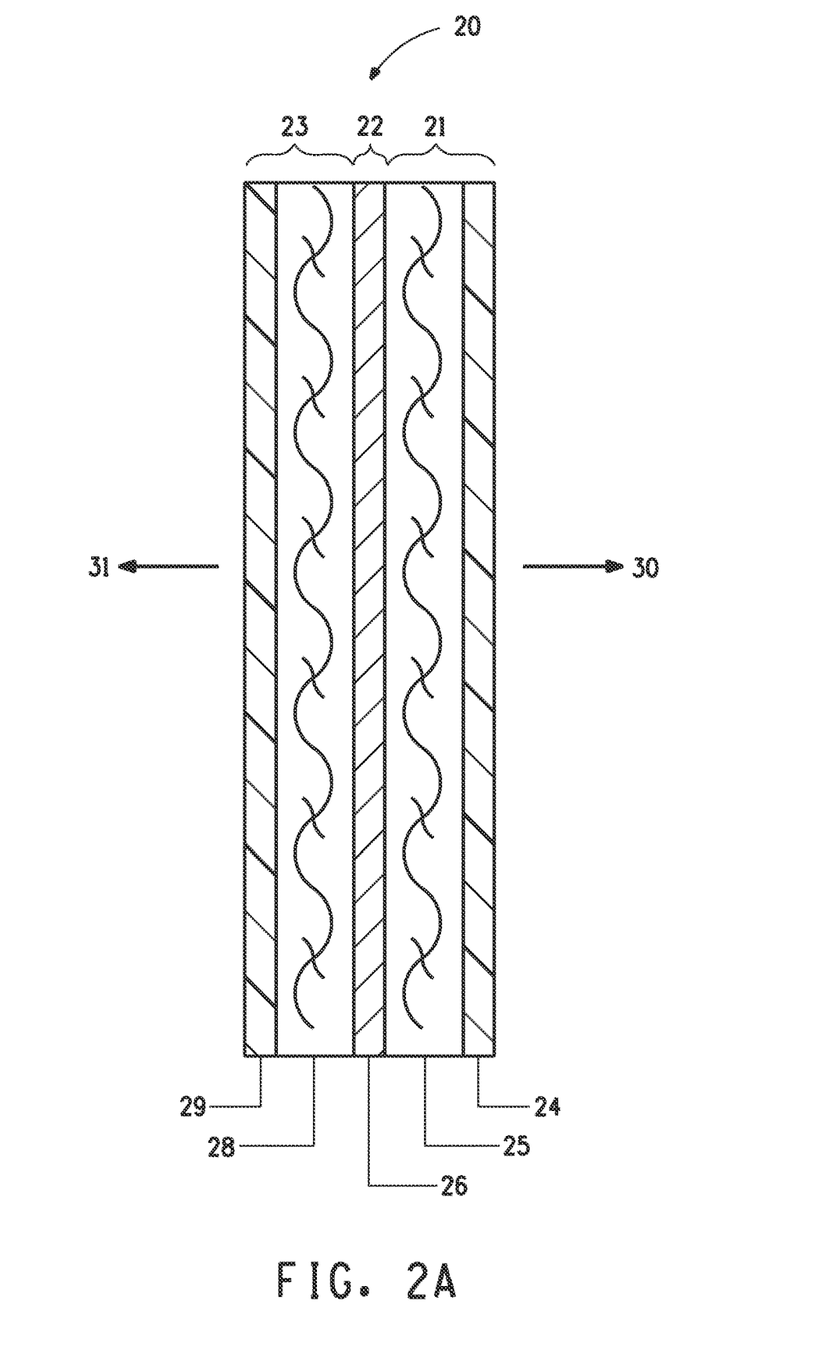
FIGS. 2A to 2C show a cross section through embodiments of a non-rigid composite sheet of this invention.
Figure 2B:
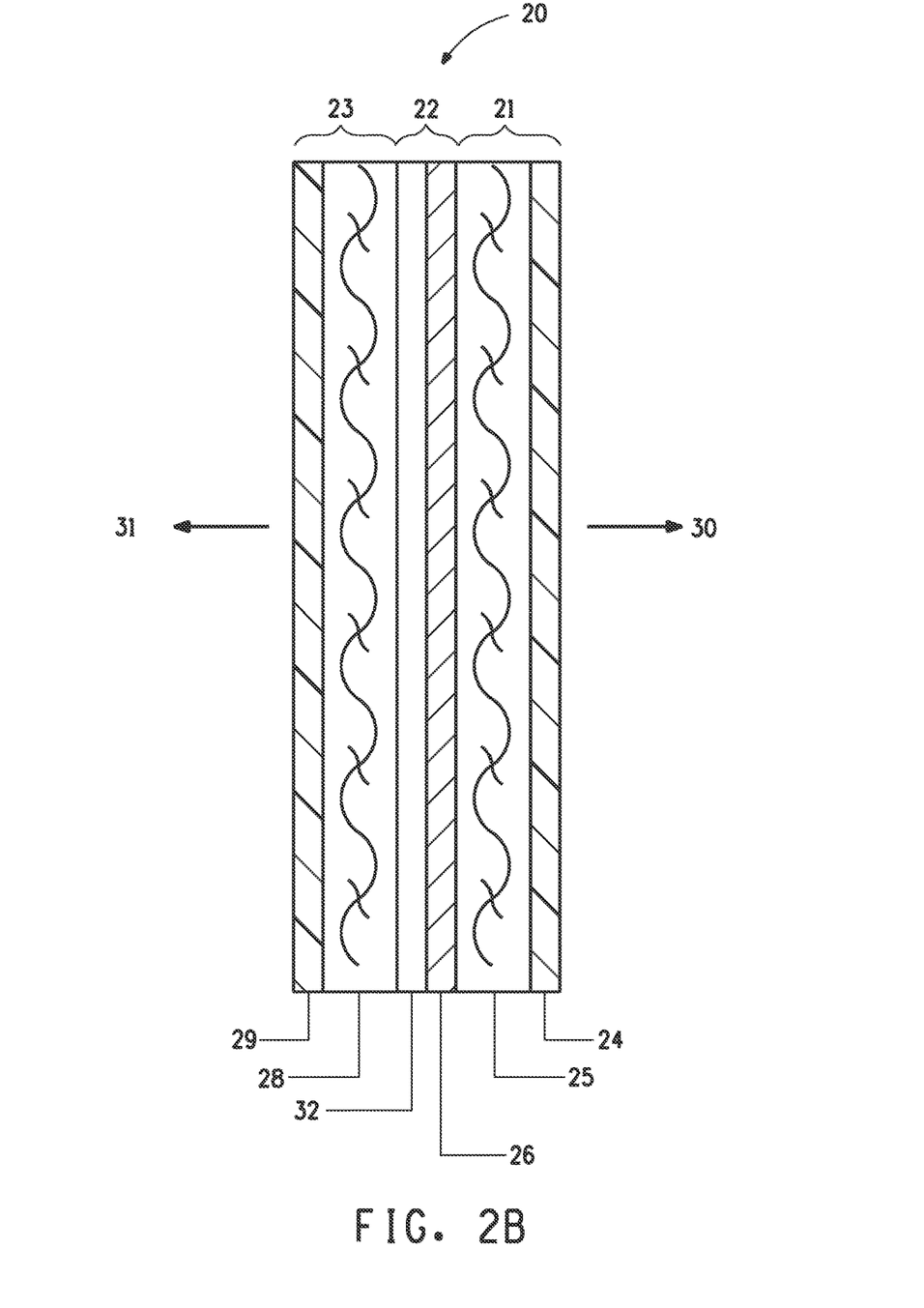

FIG. 2A shows generally at 20 a cross section through one embodiment of a non-rigid flame resistant composite sheet which comprises in order a first component 21, a second component 22 and a third component 23. The sheet is arranged between the frames of a cargo container such that the third component is the innermost component facing towards the cargo 31 and the first component is the outermost component facing away from the cargo 30.

Preferably, the composite sheet has a break strength of at least 350 N/cm (200 lb. per in.) when tested according to ASTM D3039/D3039M-08. In some embodiments, the composite sheet has a break strength of at least 525 N/cm (300 lb. per in.) or even of at least 700 N/cm (400 lb. per in.)

Some embodiments of the composite sheet provides a penetration resistance to a direct flame having a temperature of 927° C., +/−38° C. (1700° F., +/−100° F.). Some specifications also require no flame penetration of the specimen within five minutes after application of the flame source, and with the peak temperature measured at 101.6 mm (4 inches) above the upper surface of the horizontal test sample not exceeding 204° C. (400° F.) when tested according to a flame penetration FAA test method 14 CFR 25.855 Appendix F Part III—Test Method To Determine Flame Penetration Resistance of Cargo Compartment Liner (ceiling position).

Preferably, the composite sheet can withstand exposure to a temperature range of from −50° C. to +80° C. without compromising its reliability and durability over the life span of the end product.

In some embodiments, the first, second and third components may optionally be bonded to each other by means such as adhesives or thermal lamination.

First Component

The first component 21 has an areal weight of from 88 to 678 gsm (2.6 to 20 oz. per sq. yd.) and comprises a first fabric 25 of continuous filament yarns having a tenacity of at least 11 grams per dtex (10 grams per denier) and a first polymeric layer 24, the polymeric layer being the outermost layer of the composite sheet. The polymeric layer provides chemical and environmental (i.e. weather and UV) resistance to both physical and chemical attack and permeation by liquids.

By chemical and environmental/weather resistance is meant that the ability of the polymeric layer to withstand, without excessive degradation, the effects of wind, rain, contaminants such as acidic and/or oily residues found in a typical industrial areas, and sun exposure. Preferably, the polymeric layer has an enhanced ability to resist damage by chemical reactivity, or solvent action, with hydrocarbons, chemicals, ozone, bacteria, fungus, and moisture, as well as skin oils, typically associated with operation and maintenance of a commercial aircraft.

By UV resistant is meant that, when exposed to ultraviolet radiation, the polymeric layer retains its appearance and physical integrity without an excessive degradation of its flexibility and mechanical properties (i.e. brittleness). Preferably, the polymeric layer blocks at least 95% of UV rays, more preferably at least 98% and most preferably 100% of UV rays. UV imperviousness of the first polymeric film can be further mitigated by inclusion of additives in the polymeric material. Examples of such additives include fillers, colors, stabilizers and lubricants. The outer surface of the first polymeric layer that is not in contact with the first fabric may optionally be coated or treated with a UV blocking material.

Ultraviolet (UV) is an invisible band of radiation at the upper end of the visible light spectrum. At wavelengths ranging from 10 to 400 nm, ultraviolet (UV) starts at the end of visible light and ends at the beginning of X-rays. As the primary exposure of the composite sheet to ultraviolet light is the sun, the most critical UV resistance is that to the lower-frequency, longer-wavelength rays.

Preferably, the first polymeric layer has a soft, non-plastic feel that is ideal for products that come in contact with the human skin and maintains its toughness and flexibility over a wide temperature range, even at temperatures as low as −50° C. (−60° F.), over the life span of the product.

In some embodiments, the first fabric layer 25 may be bonded to the first polymeric layer 24 by chemical, thermal or mechanical means. In some embodiments, the first polymeric layer may be impregnated into the first fabric.

In some embodiments, the bond strength between the first fabric and the first polymeric layer is at least 263 N/m (1.5 lb./in). In another embodiment, the bond strength between the first fabric and the first polymeric layer is at least 438 N/m (2.5 lb./in), or even at least 876 N/m (5 lb./in).

When an adhesive is used for chemical bonding, it is preferred that the areal weight of adhesive is between 2 to 40 gsm. The adhesive layer may be a thermoplastic or thermoset resin. Thermoset resins include epoxy, epoxy novolac, phenolic and polyimide. Thermoplastic resins include polyester, polyurethane, polyetherketone, polyetheretherketone, polyetherketoneketone, polyethersulfone, and polyolefin. Thermoplastic resins are preferred.

Preferably, the adhesive layer may optionally contain up to 40 weight percent of a flame retardant ingredient. Suitable flame retardant ingredients include antimony trioxide, halogenated flame retardants including tetrabromobisphenol A, polybrominated biphenyls, pentabrominateddiphenylether (oxide), octabrominateddiphenylether(oxide), decabrominateddiphenylyether(oxide) and hexabromocyclododecane. Phosphorus containing flame retardants such as those based on organo-phosphate are also suitable.

In some embodiments, the adhesive layer blocks at least 95% of UV rays, more preferably at least 98% and most preferably 100% of UV rays. The adhesive may further comprise fillers, colors, stabilizers, and other performance enhancing additives.

The adhesive must be capable of activation, i.e. forming a bond, at a temperature in the range of 75 to 200 degrees C. In some embodiments, the activation range is from 120 to 140 degrees C. By activation we mean that for a thermoset resin, the resin must cure and bond to the polymeric layer and the fabric within the specified temperature range. For a thermoplastic resin, activation means that the resin softens and flows sufficiently to bond to the polymeric layer and the fabric.

Second Component

In some embodiments, the second component 22 has an areal weight of from 120 to 430 gsm (.) and comprises a flame resistant paper 26. In some embodiments, as shown in FIG. 2A, the paper 26 of the second component is adjacent to the first fabric 25 of the first component. and the second fabric 28 of the third component.

In one embodiment, the paper comprises from 40 to 70 weight percent of aramid fiber and from 30 to 60 weight percent of polymeric binder based on the combined weight of aramid fiber plus binder. In another embodiment, the paper comprises from 40 to 55 weight percent of aramid fibers and from 45 to 60 weight percent of binder. In some other embodiments, the paper comprises from 40 to 90 weight percent of aramid fibers and from 10 to 60 weight percent of binder. In yet another embodiment, the paper comprises from 40 to 60 weight percent of aramid fibers and from 40 to 60 weight percent of binder. A preferred binder is meta-aramid preferably in the form of fibrids.

The paper further comprises, as an additive, an inorganic material such as mica, vermiculite, ceramic fiber, glass fiber and blends thereof.

Preferably the flame resistant paper comprises, on the basis of total paper weight, from 25 to 60, preferably 35 to 45, weight percent meta-aramid fibrids, 0 to 20, preferably 10 to 15, weight percent meta-aramid floc, and 40 to 90 or 40 to 70, preferably 45 to 55, weight percent additive. Compositions having less than 25 weight percent meta-aramid fibrids lack the needed flexibility and strength while compositions having more than 60 weight percent meta-aramid fibrids are too weak in a flame to prevent disintegration. Compositions with some meta-aramid floc exhibit improved strength and flexibility but compositions with more than 20 weight percent floc exhibit reduced strength and composition cohesiveness. Compositions having less than 40 weight percent additive lack needed heat resistance to withstand flame penetration, while paper compositions having more than 90 weight percent additive are too stiff and brittle.

The term "fibrids" as used herein, means a finely-divided polymer product of small, filmy, essentially two-dimensional, particles having a length and width of 100 to 1000 micrometers and a thickness of 0.1 to 1 micrometer. Fibrids are typically made by streaming a polymer solution into a coagulating bath of liquid that is immiscible with the solvent of the solution. The stream of polymer solution is subjected to strenuous shearing forces and turbulence as the polymer is coagulated.

The fiber may be in the form of floc. Floc comprises generally short fibers made by cutting continuous filament fibers into short lengths without significant fibrillation; and the lengths of the short fibers can be of almost any length. An example of a suitable range is from 1 mm to 12 mm for a reinforcing fiber and from 5 mm to 800 mm for a staple fiber that is spun into a yarn. Short fibers suitable for use in the present invention are the reinforcing fibers disclosed in U.S. Pat. No. 5,474,842 to Hoiness.

Mica is a preferred additive material. Mica is a crystallized mineral silicate in a variety of monoclinic forms that readily separate into very thin leaves or platelets. Examples of mica are grannitic potassium and pyroxenic mica. In some embodiments, the mica has a flat particle size of 100 to 500 microns and a thickness of 0.05 to 0.15 micrometers.

Vermiculite is a hydrated magnesium aluminosilicate micaceous mineral found in nature as a multilayer crystal. Vermiculite typically comprises by (dry) weight, on a theoretical oxide basis, about 38-46% $SiO_2$, about 16-24% MgO, about 11-16% $Al_2O_3$, about 8-13% $Fe_2O_3$ and the remainder generally oxides of K, Ca, Ti, Mn, Cr, Na, and Ba. "Exfoliated" vermiculite refers to vermiculite that has been treated, chemically or with heat, to expand and separate the layers of the crystal, yielding high aspect ratio vermiculite platelets.

Alumina-silicate fiber is an example of a ceramic fiber.

Suitable papers include Nomex® 418 and Nomex® 419 available from DuPont comprising a blend of m-aramid fibers and mica, the mica being present in an amount of about 50 weight percent. The addition of these performance enhancing additives is to impart properties such as improved fire resistance, thermal conductivity, dimensional stability, and the like to the paper and the composite sheet. In some embodiments, the paper is calendered.

The thickness of a paper used in this invention is dependent upon the end use or desired properties of the laminate but, to provide an overall high flexibility and the lowest possible weight, is typically from 0.100 to 0.375 mm or even from 0.125 to 0.250 mm thick. The paper thickness may even be from 0.150 to 0.200 mm. A paper thickness below 0.100 mm would result in undesirable features such as a weaker and less dimensionally stable second component, with unsatisfactory flame barrier properties. A paper having a thickness greater than 0.375 mm would add undesirable weight and stiffness.

In some embodiments, the basis weight of a paper paper is from 135 to 315 gsm or from 195 to 255 gsm.

The paper has a dry tensile strength of at least 2625 N/m (15 lb/in) in a first direction and at least 1750 N/m (10 lb/in) in a second direction, the second direction being transverse to the first direction. By dry tensile strength we mean the tensile strength of a paper that has been conditioned at ambient temperature and humidity, typically 48-52% Relative Humidity and 22-24 degrees C. TAPPI T-402 sp-08 is an example specification defining ambient conditions for paper, board and pulp products. A dry tensile strength of at least 1225 N/m (7 lb/in) in a first direction is required to ensure proper handling of the paper through the subsequent process steps, in particular, to ensure tight roll formation during winding to prevent roll sagging and telescoping.

In some embodiments, the paper has a dry tensile strength of at least 5000 N/m in the first direction and at least 3500 N/m in the second direction. Paper may even have dry tensile strength of at least 6500 N/m in the first direction and at least 4500 N/m in the second direction.

The aramid fibers of the paper may be meta-aramid, para-aramid or a combination of the two.

The high temperature properties of the aramid fibers ensure thermal and mechanical stability of the paper during processing steps when the paper can be exposed to a temperature of 150 degrees C. for at least 10 minutes, that is to say, that the paper will not change dimensions when subjected to a temperature of 150 degrees C. for at least 10 minutes.

The aramid fibers of the paper can be in the form of floc, pulp, or a combination of thereof. As employed herein the term aramid means a polyamide wherein at least 85% of the amide (—CONH—) linkages are attached directly to two aromatic rings. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid.

Floc is generally made by cutting continuous spun filaments into specific-length pieces. If the floc length is less than 2 millimeters, it is generally too short to provide a paper with adequate strength; if the floc length is more than 25 millimeters, it is very difficult to form uniform wet-laid webs. Floc having a diameter of less than 5 micrometers, and especially less than 3 micrometers, is difficult to produce with adequate cross sectional uniformity and reproducibility; if the floc diameter is more than 20 micrometers, it is very difficult to form uniform papers of light to medium basis weights.

The term "pulp", as used herein, means particles of fibrous material having a stalk and fibrils extending generally therefrom, wherein the stalk is generally columnar and 10 to 50 micrometers in diameter and the fibrils are fine, hair-like members generally attached to the stalk measuring only a fraction of a micrometer or a few micrometers in diameter and 10 to 100 micrometers long. Aramid fiber floc is of a similar length to carbon fiber floc. Both meta and para aramid fibers are suitable and are available from E.I. DuPont de Nemours, Wilmington, Del. (DuPont) under the tradenames Kevlar® and Nomex® and from Teijin Twaron, Conyers, Ga. under the tradename Twaron®.

A preferred pulp material is p-aramid. However a blend of p-aramid with other synthetic or natural fibers such as liquid crystal polyester, polyareneazole, meta-aramid, and cellulose can be utilized. One illustrative process for making aramid pulp is disclosed in U.S. Pat. No. 5,084,136 to Haines et al.

Different thermoset and thermoplastic resins can be used as a polymeric binder in the paper of this invention. These resins can be supplied in the form of fibrids, flakes, powder, and floc. The term "fibrids" as used herein, means a very finely-divided polymer product of small, filmy, essentially two-dimensional, particles known having a length and width of 100 to 1000 micrometers and a thickness of 0.1 to 1 micrometer. Preferable types of binder resins are aramids, polyimides, phenolics, and epoxies. However, other types of the resins can also be used.

Fibrids are typically made by streaming a polymer solution into a coagulating bath of liquid that is immiscible with the solvent of the solution. The stream of polymer solution is subjected to strenuous shearing forces and turbulence as the polymer is coagulated. The fibrid material of this invention can be selected from meta or para-aramid or blends thereof. More preferably, the fibrid is a meta-aramid.

Exemplary combinations of fibrids and floc include m-aramid fibrids and m-aramid floc; m-aramid fibrids and p-aramid floc; m-aramid fibrids and a blend of p-aramid floc and polethyleneterephthalate (PET) floc; p-aramid fibrids and p-aramid floc; and p-aramid fibrids with p-aramid pulp and p-aramid floc.

In one preferred embodiment, the fiber and the polymer binder in the form of fibrids can be slurried together to form a mix that is converted to paper on a wire screen or belt. Reference is made to U.S. Pat. Nos. 4,698,267 and 4,729,921 to Tokarsky; U.S. Pat. No. 5,026,456 to Hesler et al.; U.S. Pat. Nos. 5,223,094 and 5,314,742 to Kirayoglu et al for illustrative processes for forming papers from aramid fibers and aramid fibrids.

Once the paper is formed, it may be calendered to the desired void content/apparent density.

Figure 2C:
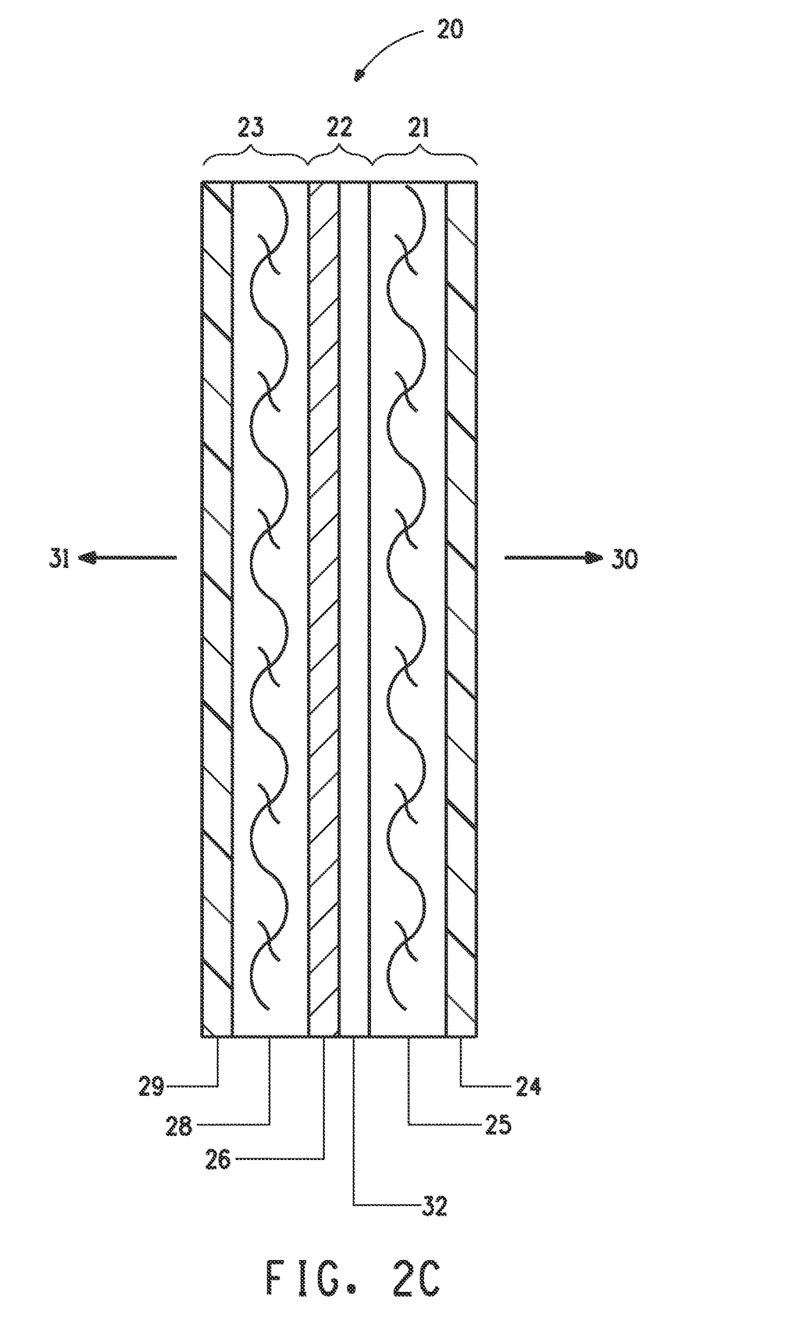

Optionally, as shown in FIGS. 2B and 2C, the second component may include a protective polymeric layer 32 in contact with the paper 26. Such a protective polymeric layer provides mechanical reinforcement and protection to the paper during manufacturing, installation and service. The protective polymeric layer may be on one or both sides of the paper. In a preferred embodiment, the protective polymeric layer is in a form of a self-supporting film.

In some embodiments, the protective polymeric layer 32 may be bonded to the paper 26 by means such as an adhesive or thermal bonding. In some embodiments, the bond strength between the protective polymeric layer and the paper is at least 140 N/m (0.8 lb./in). In another embodiment, the bond strength between the protective polymeric layer and the paper is at least 262 N/m (1.5 lb./in.).

The protective polymeric layer 32 must be capable of withstanding a temperature of at least 200 degrees C. for at least 10 min. The polymeric layer may be a thermoset or thermoplastic material. A thermoplastic layer is preferred.

Preferably the protective layer 32 should have a UL 94 flame classification of V-0. UL 94 flame classification is an Underwriters Laboratory test, The Standard for Flammability of Plastic Materials for Parts in Devices and Appliances, which measures a material's tendency either to extinguish or to spread the flame once the specimen has been ignited. V-0 indicates that the material is tested in a vertical position and self-extinguishes within ten seconds after the ignition source is removed.

Preferably, the protective layer has a thickness in the range of from 4 to 30 micrometers. More preferably the thickness range should be from 5 to 15 micrometers and most preferably in the range from 5 to 7 micrometers. The layer further provides mechanical strength and stiffness to the laminate.

Suitable materials for the protective layer include polyketone, polyimide, polysulfone, polyarylene sulfide, fluoropolymers, liquid crystal polymers and polycarbonate. Examples of polyketone are polyetheretherketone (PEEK) and polyetherketoneketone (PEKK). Polyethersulfone and polyphenylsulfone are examples of polysulfone. Poly(p-phenylene sulfide is a suitable polyarylene sulfide for use in this invention. Polyvinylfluoride (PVF) and polyvinylidinefluoride (PVDF) are examples of fluoropolymers. A suitable fluoropolymer is available from DuPont under the tradename Tedlar. Polyarylate is an example of a suitable liquid crystal polymer. Some of these films may also be coated with a second polymeric material. For example, a polyimide film, Kapton®, may be coated with fluorinated ethylene propylene, FEP and used in this invention.

The surface of the protective layer 32 may optionally be treated to improve adhesion with paper such as with an adhesive. Suitable surface treatment methods include, but are not limited to, corona etching and washing with coupling agents such as ammonium, phosphonium or sulfonium salts. Where the protective layer is adhesively bonded to the paper 26 and the fabric layer 25 and/or 28, the adhesive may be a thermoplastic or thermoset resin. Thermoset resins include epoxy, epoxy novolac, phenolic, polyurethane, and polyimide. Thermoplastic resins include polyester, polyetherketone, polyetheretherketone, polyetherketoneketone, polyethersulfone, and polyolefin. Thermoplastic resins are preferred.

To prevent possible damage from mechanical stressing exerted by a shrinking or melting or disintegrating protective polymeric layer on the paper during a flame propagating event, it is preferred that inter-ply bond of the composite laminate would fail (i.e. release or melt or soften) in the early stage of the flame exposure thus causing internal debonding of the composite laminate. That is to say, delamination of the paper from the protective film will occur before the protective film starts disintegrating. Due to their relatively low activation temperatures, thermoplastic adhesives are a preferred choice over thermoset adhesives as they will facilitate effective delamination.

The adhesive layer used to bond the protective layer to the paper may optionally contain up to 40 weight percent of a flame retardant ingredient. Suitable flame retardant ingredients include antimony trioxide, halogenated flame retardants including tetrabromobisphenol A, polybrominated biphenyls, pentabrominateddiphenylether(oxide), octabrominateddiphenylether(oxide), decabrominateddiphenylether (oxide) and hexabromocyclododecane. Phosphorus containing flame retardants are also widely used.

Preferably, the adhesive should be capable of activation at a temperature in the range of 75 to 200 degrees C. In some embodiments, the activation range is from 120 to 140 degrees C. By activation we mean that for a thermoset resin, the resin must bond to the polymeric layer and the fabric within the specified temperature range. For a thermoplastic resin, activation means that the resin softens and flows sufficiently to bond to the polymeric layer and the fabric.

As an alternative to mica being a component of a paper, a lightweight open weave fabric scrim may be embedded into or laid onto a layer of mica platelets. The scrim can be made from natural, organic or inorganic fibers with glass, cotton, nylon or polyester being typical examples. A glass fiber scrim is particularly preferred for embedding into the platelet layer. The scrim may be a woven or knit structure and has a typical areal weight not exceeding 40 grams per square meter.

In yet another embodiment, the mica layer contains 100% platelets i.e. there is no carrier material such as resin, adhesive, cloth or paper. However, there may be some residual dispersant arising from incomplete drying of the mica during formation of the mica platelet layer.

Third Component

The third component 23 has an areal weight of from 88 to 678 gsm (2.6 to 20 oz. per sq. yd.) and comprises a second fabric 28 of filamentary yarns having a tenacity of at least 11 grams per dtex (10 grams per denier) and a second polymeric layer 29, the second fabric of the third component being adjacent to the paper of the second component. The second polymeric layer is the innermost layer of the composite sheet. The second polymeric layer provides enhanced abrasion/scuff and puncture resistance, improved impact toughness as well as an enhanced resistance to both physical mistreatment, chemical contact attack and permeation by liquids.

Preferably, the second polymeric layer maintains its toughness and flexibility over a wide temperature range, even at temperatures as low as (−50° C. (−60° F.)), over the life span of the end product.

In some embodiments, the second fabric layer may be bonded to the second polymeric layer by means such as an adhesive, thermal bonding or by fasteners.

When an adhesive is used the adhesive layer may be a thermoplastic or thermoset resin. Thermoset resins include epoxy, epoxy novolac, phenolic, polyurethane, and polyimide. Thermoplastic resins include polyester, polyetherketone, polyetheretherketone, polyetherketoneketone, polyethersulfone, and polyolefin. Thermoplastic resins are preferred. The adhesive may optionally contain up to 40 weight percent of a flame retardant ingredient. Suitable flame retardant ingredients include antimony trioxide, halogenated flame retardants including tetrabromobisphenol A, polybrominated biphenyls, Penta-, Octa-, Decabrominated diphenyl ether (oxide) and hexabromocyclododecane. Phosphorus containing flame retardants are also widely used.

The adhesive must be capable of activation at a temperature in the range of 75 to 200 degrees C. In some embodiments, the activation range is from 120 to 140 degrees C. By activation we mean that for a thermoset resin, the resin must bond to the polymeric layer and the fabric within the specified temperature range. For a thermoplastic resin, activation means that the resin softens and flows sufficiently to bond to the polymeric layer and the fabric. The adhesive bond between the second polymeric layer and the second fabric is at least 263 N/m (1.5 lb./in). In some embodiments, the adhesive bond between the second polymeric layer and the second fabric is at least 315 N/m (1.8 lb./in), or even 876 N/m (5 lb./in).

In some embodiments, the bond strength between the second fabric 28 and the second polymeric layer 29 is at least 263 N/m (1.5 lb./in). In another embodiments, the bond strength between the second fabric and the second polymeric layer is at least 315 N/m (1.8 lb./in).

In some embodiments the second fabric may be optionally treated on one or both sides with an inorganic coating such as a ceramic.

First and Second Fabrics

In some embodiments the first or second fabrics, 25 and 28 respectively, have an areal weight of from 70 to 508 gsm (2.1 to 15 oz. per sq. yd.). In some other embodiments, the fabric areal weight is from 101 to 373 gsm (3 to 11 oz. per sq. yd.). In some embodiments, the first fabric has an areal weight of from 101 to 170 gsm (3 to 5 oz. per sq. yd.). In some embodiments, the second fabric has an areal weight of from 170 to 270 gsm (5 to 8 oz. per sq. yd.).

The first or second fabrics may be woven or non-woven. Typical woven fabric styles are plain, basket, leno twill or satin weaves. In one embodiment, the first fabric is a plain weave fabric comprising 555 dtex (500 denier) KM2+p-aramid yarns in an amount of 11 ends per cm (28 ends per inch) in both warp and weft directions. In another embodiment, the second fabric is a plain weave fabric comprising 1111 dtex (1000 denier) KM2 p-aramid yarns in an amount of 9.4 ends per cm (24 ends per inch) in both warp and weft directions.

Fine denier yarn of the fabric combined with a tough polymeric film leads to a significant enhancement in puncture resistance, and thus overall durability, of the non-rigid composite sheet.

Nonwoven fabrics include fabrics in which the filaments are arranged in a random orientation or fabrics comprising filaments that are aligned in only one direction. This latter type of fabric is also known as a non-crimped or unidirectional fabric.

In some embodiments the first and/or second fabrics are scoured or heat cleaned after weaving. Such processes are well known in the textile industry to remove contaminants such as oil from the weaving process.

Preferably, the filamentary yarns of the first and second fabrics comprise aromatic polyamide or aromatic copolyamide. Glass fiber and carbon fiber, especially carbon fiber based on polyacrylonitrile, may also be used.

The fabrics 25 and 28 are made from multifilament yarns having a plurality of filaments. The yarns can be intertwined and/or twisted. For purposes herein, the term "filament" is defined as a relatively flexible, macroscopically homogeneous body having a high ratio of length to width across its cross-sectional area perpendicular to its length. The filament cross section can be any shape, but is typically circular or bean shaped. Herein, the term "fiber" is used interchangeably with the term "filament", and the term "end" is used interchangeably with the term "yarn".

The filaments can be any length. Preferably the filaments are continuous. Multifilament yarn spun onto a bobbin in a package contains a plurality of continuous filaments. The multifilament yarn can be cut into staple fibers and made into a spun staple yarn suitable for use in the present invention. The staple fiber can have a length of about 1.5 to about 5 inches (about 3.8 cm to about 12.7 cm). The staple fiber can be straight (i.e., non crimped) or crimped to have a saw tooth shaped crimp along its length, with a crimp (or repeating bend) frequency of about 3.5 to about 18 crimps per inch (about 1.4 to about 7.1 crimps per cm).

In some embodiments, the yarns have a yarn tenacity of at least 11 grams per dtex and a modulus of at least 100 grams per dtex. In some embodiments, the yarns have a linear density of from 333 to 2222 dtex (300 to 2000 denier) or from 555 to 1111 dtex (500 to 1000 denier). In some embodiments, the yarns of the first or second fabrics have a linear density of 555 dtex or of 1111 dtex.

When the polymer is polyamide, aramid is preferred. The term "aramid" means a polyamide wherein at least 85% of the amide (—CONH—) linkages are attached directly to two aromatic rings. Suitable aramid fibers are described in Man-Made Fibres—Science and Technology, Volume 2, Section titled Fibre-Forming Aromatic Polyamides, page 297, W. Black et al., Interscience Publishers, 1968. Aramid fibers and their production are, also, disclosed in U.S. Pat. Nos. 3,767,756; 4,172,938; 3,869,429; 3,869,430; 3,819,587; 3,673,143; 3,354,127; and 3,094,511.

The preferred aramid is a para-aramid. The preferred para-aramid is poly(p-phenylene terephthalamide) which is called PPD-T. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

Additives can be used with the aramid and it has been found that up to as much as 10 percent or more, by weight, of other polymeric material can be blended with the aramid. Copolymers can be used having as much as 10 percent or more of other diamine substituted for the diamine of the aramid or as much as 10 percent or more of other diacid chloride substituted for the diacid chloride or the aramid.

Another suitable fiber is one based on aromatic copolyamide prepared by reaction of terephthaloyl chloride (TPA) with a 50/50 mole ratio of p-phenylene diamine (PPD) and 3,4'-diaminodiphenyl ether (DPE). Yet another suitable fiber is that formed by polycondensation reaction of two diamines, p-phenylene diamine and 5-amino-2-(p-aminophenyl) benzimidazole with terephthalic acid or anhydrides or acid chloride derivatives of these monomers.

Glass fibers include "E" glass and "S" Glass. E-Glass is a commercially available low alkali glass. One typical composition consists of 54 weight % $SiO_2$, 14 weight % $Al_2O_3$, 22 weight % CaO/MgO, 10 weight % $B_2O_3$ and less then 2 weight % $Na_2O/K_2O$. Some other materials may also be present at impurity levels S-Glass is a commercially available magnesia-alumina-silicate glass. This composition is stiffer, stronger and more expensive than E-glass and is commonly used in polymer matrix composites.

In some embodiments the carbon fiber is a standard or intermediate modulus fiber such as those available under the tradename Torayca from Toray Industries or or HexTow from Hexcel Corporation. Typically, such fibers have 3,000 or 6,000 or 12,000 or 24,000 filaments per tow.

In some embodiments first and/or second fabrics may optionally be treated with a flame retardant ingredient to aid flame propagation properties of the non-rigid Flame Resistant Composite. Suitable flame retardant ingredients include antimony trioxide, halogenated flame retardants including tetrabromobisphenol A, polybrominated biphenyls, pentabrominateddiphenylether(oxide), octabrominateddiphenylether(oxide), decabrominateddiphenylyether(oxide) and hexabromocyclododecane. Phosphorus containing flame retardants are also widely used.

First and Second Polymeric Layers

The polymer of the first or second or both polymeric layers, 24 and 29 respectively, may be a thermoplastic or thermoset polymer. A thermoplastic polymer is preferred.

In a preferred embodiment, the first and second polymeric layers are in a form of a self-supporting film.

Suitable polymers include polyurethane, polyethylene, polypropylene, polyethylenenaphthalate, polyacrylonitrile, fluoropolymer, polyimide, polyketone, polyimide (Kapton®), polysulfone, polyarlene sulfide, liquid crystal polymer, polycarbonate, and ionomers such as ethylenemethacrylicacid copolymer (E/MAA).

Exemplary fluoropolymers include polyvinylfluoride (Tedlar®), etyhylenechlorotrifluoroethylene copolymer (Halar®) and polytetrafluroethylene (Teflon®). Exemplary polyketones include polyetheretherketone (PEEK) and polyetherketoneketone (PEKK).

In one embodiment, the first polymeric layer is polyurethane. In another embodiment, the second polymeric layer is an ionomeric resin such as ethylenemethacrylicacid copolymer. In yet another embodiment, the first polymeric layer is non-transparent and impervious to UV rays. By non-transparent and impervious to UV rays we mean that the first polymeric layer blocks at least 95% of UV rays, more preferably at least 98% and most preferably 100% of UV rays especially those rays at the upper end of the UV spectrum.

In some embodiments the first and/or second polymeric layers have an areal weight of 17 to 170 gsm (0.5 to 5 oz. per sq. yd.) or from 34 to 136 gsm (1 to 4 oz. per sq. yd.) or even from 67 to 102 gsm (2 to 3 oz. per sq. yd.).

In some embodiments, at least one surface of the first and/or second polymeric layers may be metalized. Preferably in the composite sheet, the metalized surface is on the side of the polymeric layer adjacent to the first or second fabrics.

Use

The composite sheet as described herein can find use in many applications where protection against flame and fire is required. Examples include the sidewalls and ceiling of a cargo container, a fire-resistant cover, a separator such as is used in a battery and a blanket or liner as may be used in an aircraft, train or building.

Test Methods

The composite sheets were subjected to a flame penetration test that replicated the temperature and air mass flux test conditions of test method 14 CFR 25.855 Appendix F Part III—Test Method To Determine Flame Penetration Resistance of Cargo Compartment Liner. The somewhat lower heat flux used was compensated for with a higher air mass flux to replicate the required thermo-mechanical stress level to be exerted on the flame barrier composites during the burn-through test.

Tensile properties of the composite sheet were determined by ASTM D3039/D3039M-08 Standard Test Method for Tensile Properties of Polymer Matrix Composite Materials.

The dry tensile strength of the paper was measured according to ASTM D-828 Tensile Properties of Paper and Paperboard (Using Constant Rate of Elongation Apparatus).

The thickness of the paper was measured by TAPPI T411 om-10 Thickness (Caliper) of Paper, Paperboard, and Combined Board.

The dry areal weight of the paper was measured according to ISO 536 (1995) Determination of Grammage and TAPPI T 410 Grammage of Paper and Paperboard (Weight per Unit Area).

The moisture content of the paper was measured according to ISO 287 (1985) Determination of Moisture Content—Oven Drying Method.

EXAMPLES

Example 1

A non-rigid composite sheet was prepared.
First Component

The first component comprised a woven fabric (first fabric) thermally bonded to a non-transparent 0.075 mm (3 mil) blown polyurethane film (first polymeric layer) having an areal weight of 1.05 g/cm³ resulting in an areal weight of 85 gsm. The fabric had an areal weight of 125 gsm (3.7 oz./sq.yd.). The fabric was a plain weave having 28 ends per inch in both warp and weft and was woven from 556 dtex (500 denier) p-aramid Kevlar® KM2+ yarns, merge 1W034. The yarns had a nominal tenacity of 31 g/dtex. The bond strength between first polymeric film and first fabric was tested to be at least 437 N/m (2.5 lb./in).

Second Component

The second component comprised 0.200 mm (8 mil) Nomex® grade T418 paper having a nominal basis weight of 237 gsm. The paper had a nominal tensile strength in of 8700 N/m a first direction (machine direction) and 6000 N/m in a second direction (cross direction) when measured according to ASTM D-828.

Third Component

The third component comprised a woven fabric (second fabric) thermally bonded to a 0.075 mm (3 mil) ionomeric Surlyn® film (second polymeric layer) having an areal weight of 0.94 g/cm$^3$ resulting in an areal weight of 76 gsm. The fabric had an areal weight of 220 gsm (6.5 oz./sq.yd.). The fabric was a plain weave having 24 ends per inch (9.4 ends/cm) in both warp and weft and was woven from 1111 dtex (1000 denier) p-aramid Kevlar® KM2 yarns, merge 1W041. The yarns had a nominal tenacity of 30 g/dtex. The bond strength between first polymeric film and first fabric was tested to be at least 262 N/m (1.5 lb./in).

The first, second and third components were assembled together as shown in FIG. 2A. The second component was not bonded to either the first component or the third component.

The fabricated composite sheet was subjected to two flame penetration tests. In the first test, the test sample was in a ceiling position, with the Surlyn® film side of the composite facing the flame. The sample showed a good resistance to flame penetration, with the paper acting as an effective barrier to 927° C., +/−38° C. (1700° F., +/−100° F.) flame, with no flame penetration of the specimen within 5 minutes after application of the flame source. The peak temperature measured at 4 inches above the upper surface of the horizontal test sample did not exceed 204° C. (400° F.).

In the second test, the test sample was in a vertical position with the Surlyn® film side of the composite facing the flame. The sample showed a good resistance to flame penetration, with the paper acting as an effective barrier to 927° C., +/−38° C. (1700° F., +/−100° F.) flame, with no flame penetration of the specimen within 5 minutes after application of the flame source. The peak temperature measured at 4 inches above the upper surface of the horizontal test sample did not exceed 204° C. (400° F.).

The mechanical strength of the composite sheet was also tested to comply with durability standards set by National Aerospace Standard NAS 3610 for materials used for air cargo Unit Load Devices. The axial tensile strength of 101.6 mm (4 inch) wide strips of the composite sheet was 1,700+/−50 lbs or 771+/−22 kg (425+/−12.5 lb/in or 74228+/−2189 N/m).

Comparative Example A

A composite sheet was fabricated comprising a 322 gsm (9.5 oz./sq. yd.). woven fabric thermally bonded between the 0.075 mm (3 mil) polyurethane (first polymeric layer) and the 0.075 mm (3 mil) Surlyn® (second polymeric layer) films of Example 1. The bond strength between the PU film and fabric was at least 437 N/m (2.5 lbs/in). The fabric was a plain weave having 24 ends per inch (94 ends per cm) in both warp and weft and was woven from 1667 dtex (1500 denier) p-aramid Kevlar® 29 yarns, merge 1F211. The axial tensile strength of a 101.6 mm (4 inch) wide strip of the single layer composite was no greater than 900 lbs or 408 kg (225 lb/in or 39403 N/m).

Comparable Example A was tested as complying with flammability requirements of TSO C90a Cargo Pallets, Nets and Containers (Unit Load Devices) specification for vertical and horizontal flame propagation. However, it lacked any effective flame barrier properties as, when exposed to flame, the sample failed flame penetration within 30 seconds after application of the flame source.

Example 2

This example was prepared as per Example 1 except that component 2 was thermally bonded to components 1 and 3 with a layer of a 0.025 mm (1 mil) cast polyurethane film containing up to 50 weight percent of a flame retardant ingredient.

Example 2 was subjected, in a ceiling position, to the flame penetration test. The flame was applied on the Surlyn® film side of the composite. The sample showed a good resistance to flame penetration, with the paper acting as an effective barrier to 927° C., +/−38° C. (1700° F., +/−100° F.) flame, with no flame penetration of the specimen within 5 minutes after application of the flame source. The peak temperature measured at 4 inches above the upper surface of the horizontal test sample did not exceed 204° C. (400° F.).

Example 3

This example was prepared as per Example 1 except that the second component was 0.125 mm (5 mil) Nomex® grade T418 paper having a nominal basis weight of 148 gsm. The paper had a nominal tensile strength in of 5200 N/m a first direction (machine direction) and 3500 N/m in a second direction (cross direction) when measured according to ASTM D-828.

The composite sheet of Example 3 was subjected, in a ceiling position, to the flame penetration test. The flame was applied on the Surlyn® film side of the composite. The sample showed a good resistance to flame penetration, with the paper acting as an effective barrier to 927° C., +/−38° C. (1700° F., +/−100° F.) flame, with no flame penetration of the specimen within 5 minutes after application of the flame source. The peak temperature measured at 4 inches above the upper surface of the horizontal test sample did not exceed 204° C. (400° F.).

The composite sheet was also subjected to a flame penetration test with a sheet in the vertical position. The flame was applied on the Surlyn® film side of the composite. The samples showed an inconsistent resistance to flame penetration, with flame penetrating at least 30% of specimens within 5 minutes after application of the flame source.

The flame penetration test with the sample in the ceiling position was considered to be acceptable but the test with the sample in the vertical position was considered to be only marginally acceptable.

Comparative Example B

This example was prepared as per Example 1 except that a 0.075 mm (3 mil) Nomex® grade T418 paper having a nominal basis weight of 89 gsm was used. The paper had a nominal tensile strength in of 2900 N/m a first direction (machine direction) and 1900 N/m in a second direction (cross direction) when measured according to ASTM D-828.

The composite sheet of this example was subjected, in a ceiling position, to the flame penetration test. The flame was applied on the Surlyn® film side of the composite. The samples showed an inconsistent resistance to flame penetration, with flame penetrating majority of specimens within 5 minutes after application of the flame source. This test result was deemed to be not acceptable.

What is claimed is:

1. A non-rigid composite sheet comprising in order
   (i) a first component having an areal weight of from 88 to 678 gsm comprising a first woven fabric having an areal weight of from 70 to 508 gsm, the fabric comprising continuous filament yarns having a tenacity of at least 11 g/dtex and a first polymeric layer
   (ii) a second component having an areal weight of from 120 to 430 gsm comprising a paper positioned adjacent to the first fabric of the first component and the second fabric of the third component, the paper further comprising aramid fibers, a polymeric binder and mica, and
   (iii) a third component having an areal weight of from 88 to 678 gsm comprising a second woven fabric having an areal weight of from 70 to 508 gsm, the fabric comprising continuous filament yarns having a tenacity of at least 11 g/dtex and a second polymeric layer, the second fabric of the third component being adjacent to the paper of the second component,
   wherein
      (a) the yarns of the first and second fabrics comprise aromatic polyamide, aromatic copolyamide, glass fiber or carbon fiber, and
      (b) the polymer of the first polymeric layer of the first component and second polymeric layer of the third component is polyurethane, polyethylene, polypropylene, polyethylenenaphthalate, polyacrylonitrile, fluoropolymer, polyimide, polketone, polyimide, polysulfone, polyarylene sulfide, liquid crystal polymer, polycarbonate or an ionomer,
         wherein the polymeric binder of the paper is present in an amount of from 45-60 weight percent based on the combined weight of aramid fiber plus binder present in the paper.

2. The composite sheet of claim 1, wherein the composite has a break strength of at least 350 N/cm.

3. The composite sheet of claim 1, wherein the composite sheet can withstand a flame temperature of 927° C. for 5 minutes without burn-through penetration when tested according to FAA test method 14 CFR 25.855 Appendix F Part III.

4. The composite sheet of claim 1, wherein the composite sheet can withstand a flame temperature of 927° C. for 5 min without burn-through penetration and the temperature 101 mm away from the side of the sheet remote from the flame does not exceed 204° C. when tested according to FAA test method 14 CFR 25.855 Appendix F Part III.

5. The composite sheet of claim 1, wherein the first fabric has an areal weight from 101 to 170 gsm.

6. The composite sheet of claim 1, wherein the second fabric has an areal weight from 170 to 270 gsm.

7. The composite sheet of claim 1, wherein the filamentary yarns of the first and/or second fabrics comprise have a linear density of from 333 to 2222 dtex.

8. The composite sheet of claim 1 wherein the paper has a dry areal weight of from 195 to 255 gsm.

9. The composite sheet of claim 1 wherein the paper has a moisture content of no greater than 10%.

10. The polymer of claim 1 wherein the ionomer is ethylenemethacrylicacid copolymer.

11. A cargo container comprising a frame assembly, a plurality of side walls, a ceiling and a floor wherein the sidewalls and ceiling comprise the non-rigid composite sheet of claim 1.

12. A fire-resistant cover, separator, blanket or liner comprising the non-rigid composite sheet of claim 1.

* * * * *